(12) United States Patent
Chiu

(10) Patent No.: US 7,296,917 B1
(45) Date of Patent: Nov. 20, 2007

(54) WIRELESS REMOTE-CONTROLLED SEARCHLIGHT WITH IMPROVED MANIPULATOR

(76) Inventor: Shin-Yung Chiu, 1F., No. 5, Lane 35, Sec. 2, Baoyuan Rd., Sindian City, Taipei County (TW) 231

( * ) Notice: Subject to any disclaimer, the term of this patent is extended or adjusted under 35 U.S.C. 154(b) by 0 days.

(21) Appl. No.: 11/471,497

(22) Filed: Jun. 21, 2006

(51) Int. Cl.
*B60Q 1/00* (2006.01)

(52) U.S. Cl. ............... 362/464; 362/512; 362/111; 340/825.69

(58) Field of Classification Search ............... 362/464, 362/512, 111, 276; 340/825.69, 10.5
See application file for complete search history.

(56) References Cited

U.S. PATENT DOCUMENTS

| | | | | |
|---|---|---|---|---|
| 4,930,057 A | * | 5/1990 | Williams | 362/272 |
| 5,438,325 A | * | 8/1995 | Nishigaki et al. | 340/825.24 |
| 6,582,105 B1 | * | 6/2003 | Christensen | 362/385 |
| 7,057,494 B2 | * | 6/2006 | Fitzgibbon | 340/5.7 |
| 2004/0198336 A1 | * | 10/2004 | Jancic et al. | 455/420 |
| 2005/0248930 A1 | * | 11/2005 | Naval et al. | 362/85 |

* cited by examiner

*Primary Examiner*—Thomas M. Sember
*Assistant Examiner*—Julie A. Shallenberger
(74) *Attorney, Agent, or Firm*—Bacon & Thomas, PLLC

(57) ABSTRACT

A wireless remote-controlled searchlight adapted to manual remotely control and wireless remotely control comprises a hand-held manipulator having a hand controlled circuit to manual remotely control the searchlight while a four-way directional control switches and an on/off switch being selectively pressed by hand, a RF receiver particularly installed inside to receive controlled RF signals transmitted from a separated potable wireless transmitter, and a MCU adapted to control a relay actuated circuit and a motor actuated circuit by according to the input corresponding received RF signals from the RF receiver to execute wireless remotely control the searchlight; and the hand-held manipulator is assembled on the position outside and away from the searchlight to get an advantage of being easy to wireless remotely control with great precision.

3 Claims, 3 Drawing Sheets

WIRELESS REMOTE-CONTROLLED SEARCHLIGHT WITH IMPROVED MANIPULATOR

BACKGROUND OF THE PRESENT INVENTION

1. Field of the Present Invention

The invention relates to a wireless remote-controlled searchlight, and more particularly to a wireless remote-controlled searchlight has a hand-held manipulator with a wireless receiver installed inside for having the receiver's assembling position outside and away from the searchlight.

2. Description of Prior Act

An example of a remote-controlled searchlight as shown in FIG. 1 is known from U.S. Pat. No. 4,930,057 to J. L. Williams, which is disclosed the remote-controlled searchlight permanently mounted to a supporting surface, such as the roof of a car or the deck of a boat, and a remote-control box capably being placed inside of a vehicle to permit the vehicle operator to switch the searchlight on and off as well as to undergo sweeping movement in both vertical and horizontal directions.

In this patent there is described a searchlight 10 which comprises a lamp housing 20 constituted by an upper housing 21 and a lower housing 22 with an integrally formed ring gear 25; a base means 30 for mounting the lamp housing 20, which has a flange 31 with several holes 32 formed for permanently mounting the base 30 by means of screws to a supporting surface for the searchlight 10; a lamp means 40 mounted in the lamp housing 20 for vertical movement, which includes a bulb housing 41 with a bearing means for mounting in the lamp housing 20 and a vertical gear member 43 integrally formed on back of the bulb housing 41; a vertical drive means 50 mounted in the lamp housing 20 for vertically driving the lamp means 40, which includes a reversible gear motor 51 having an output shaft with pinion means 52 for engaging the vertical gear member 43 of the lamp means 40; a horizontal drive means 60 mounted in the base means 30 for driving the lamp means 40 and lamp housing 20 in a horizontal plane less than 360 degrees, which includes a reversible gear motor 61 having an output shaft with a pinion means 62 for engaging the ring gear 25 of the lamp housing 20; and an electrical cable 70 with leads 71, 72 and 73 as power source extended from the lamp housing 20 and the base means 30 into a remote-control box placed inside of a vehicle, so that a bulb installed in the bulb housing 41 is connected by leads 71 to a 12-volt DC power source, the reversible gear motor 51 is connected by leads 72 to a 12-volt DC power source and the reversible gear motor 61 is connected by leads 73 to a 12-volt DC power source.

The remote-controlled searchlight 10 mentioned above is very convenient in use, but the remote-controlled searchlight 10 can not be remotely operated by wireless remote control, and the remote-controlled searchlight 10 is short of a waterproof cover to prevent rain water from seeping into the interior of the remote-controlled searchlight 10 through a gap 28 is existed in between the lamp means 40 and the lamp housing 20, so that the remote-controlled searchlight 10 is easily happened to break down under stress of weather.

Another example of a "wireless remote-controlled searchlight" is known from U.S. Pat. No. 5,673,989 to Gohl et al. Although most mechanical structures of the wireless remote-controlled searchlight are similar to that of U.S. Pat. No. 4,930,057 mentioned above, the remote control for the searchlight is preferably provided by a hand-held multi-channel radio transmitter and a locally mounted receiver contained within a lamp housing of the searchlight. The transmitter and receiver circuits control the reversible gear motor in the lamp housing for vertical and horizontal rotational movement of the lamp and the power to the lamp filament.

However, due to the receiver mounted inside the lamp housing of the searchlight and closed to the reversible gear motor, the RF transmitted from the transmitter is easily jammed by interference from the reversible gear motor, resulted in the wireless remote-controlled searchlight is frequently hard to remotely control by wireless control.

For improving the "wireless remote-controlled searchlight" mentioned above, the applicant had been filed an U.S. application Ser. No. 11/205,070 which invented and disclosed to a "searchlight improvement structure" comprising an electrical cable with four leads to supply power source for the searchlight, a RF receiver with an antenna inside which is assembled on the electrical cable to have its assembling position outside and away from the lamp housing and the base means, and two separated wireless transmitters each having an on/off switch and a four-way directional control switch, wherein one of the wireless transmitters is connected by leads of the electrical cable and the other wireless transmitter is powered by a replaceable internal power supply. Due to the RF receiver installed outside and away from the lamp housing and the base means to prevent from radio interference caused from the vertical and horizontal drive means of the searchlight, the advantage of the invented "searchlight improvement structure" is then easy to wireless remotely control with great precision.

With the instant invention, it is a further advanced improvement to the "searchlight improvement structure" of the U.S. application Ser. No. 11/205,070 mentioned above.

SUMMARY OF THE INVENTION

Therefore, the main object of the present invention is to provide a wireless remote-controlled searchlight permanently positioned on the roof of a vehicle or the deck of a boat, which comprises a hand-held manipulator having a RF receiver installed inside is placed inside of the vehicle or the boat so that the manipulator has both manually remote-controlled function and wireless remote-controlled function to the operator in use, and the manipulator is further to have the receiver's assembling position outside and away from the searchlight to enable the wireless remote-controlled searchlight of the invention to get the advantage of being easy to wireless remotely control with great precision.

The whole structure of the wireless remote-controlled searchlight comprises a lamp means mounted in a lamp housing having a vertical drive means for tilting the lamp means in a vertical direction and a horizontal drive means for rotating the lamp means in a horizontal direction, a hand-held manipulator with a RF receiver installed inside being adapted to switch the searchlight on and off as well as to undergo sweeping movement in both vertical and horizontal directions by manual remotely control, and a separated portable wireless transmitters via the RF receiver installed inside the hand-held manipulator being adapted to be wireless remotely operated from a distance to switch the searchlight on and off as well as to undergo sweeping movement in both vertical and horizontal directions by wireless remotely control.

Another object of this present invention is to provide a waterproof cover to prevent rain water from seeping into the interior of the searchlight, so that the searchlight of the invention shall be always kept in normal use under stress of weather.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
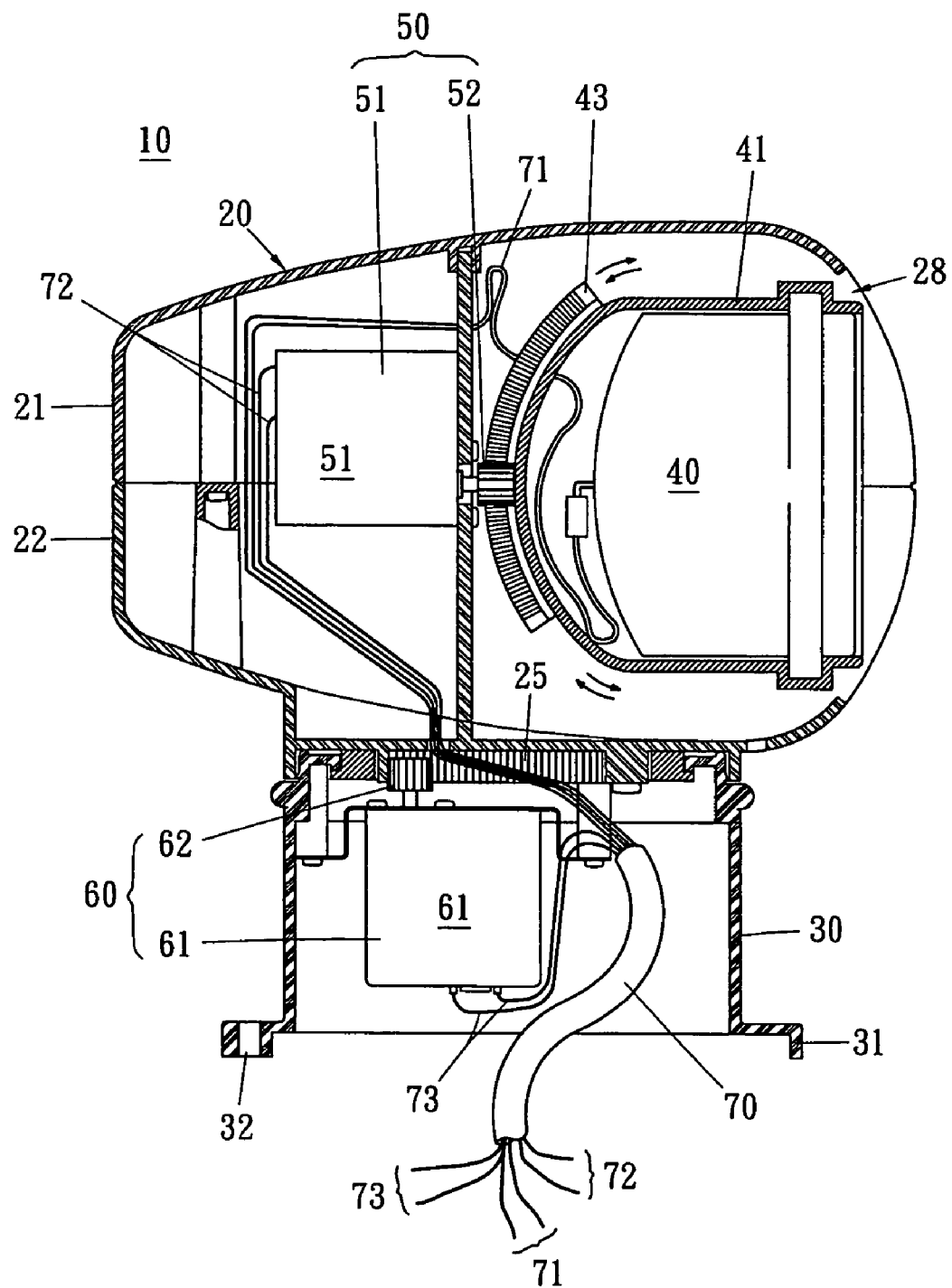
FIG. 1 is a partial cross sectional side view of the remote-controlled searchlight according to U.S. Pat. No. 4,930,057.

Before the present invention is described in greater detail, it should be noted that like elements are denoted by the same reference numerals throughout the disclosure.

Figure 2:
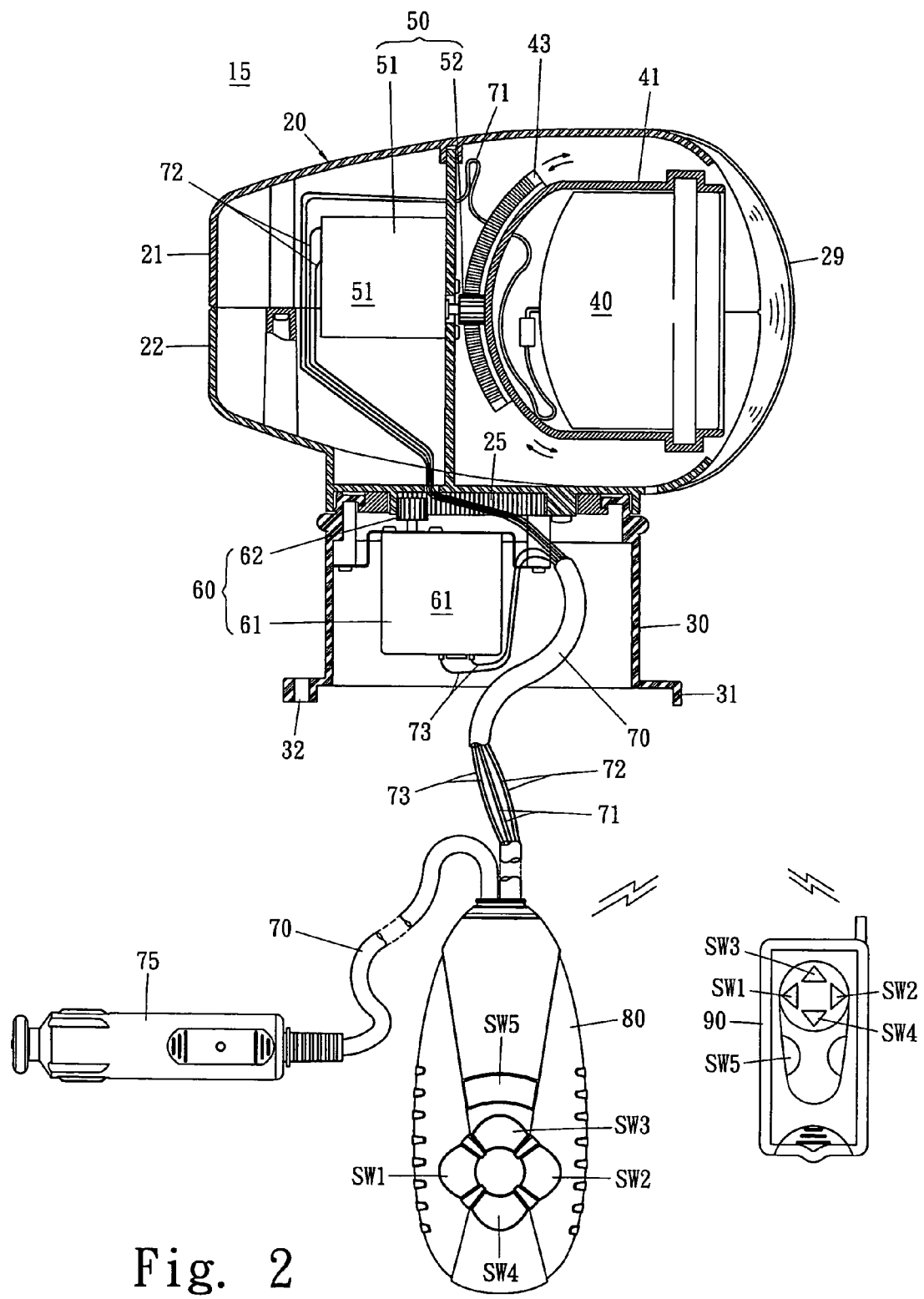
FIG. 2 is a partial cross sectional side view of the invented searchlight according to the invention.
Figure 3:
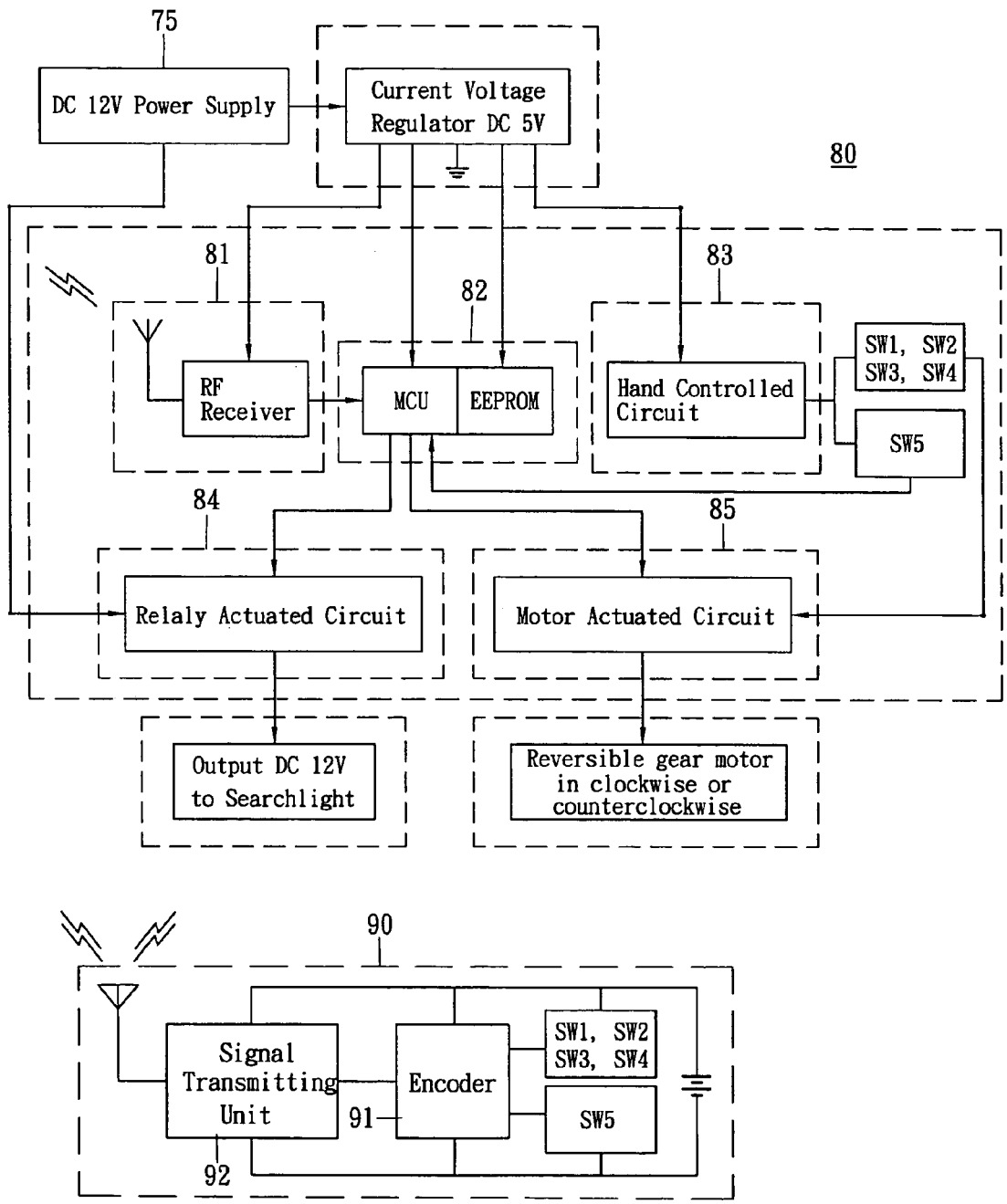
FIG. 3 is a schematic circuit diagram of the hand-held manipulator and the separated portable wireless transmitter according to the present invention for depicting the relation between components and the position of each component.

Referring to FIGS. 2 and 3, the preferred embodiment of a wireless remote-controlled searchlight 15 of the present invention is permanently positioned on the roof of a vehicle or the deck of a boat, which comprises a lamp housing 20, a base means 30, a lamp means 40, a vertical drive means 50, a horizontal drive means 60, an electrical cable 70 with a plug 75 and three leads 71, 72, and 73 as power source for the searchlight 15, a hand-held manipulator 80 with a RF receiver 81 assembled on the electrical cable 70 to have its assembling position outside and away from the lamp housing 20 and the base means 30, and a separated portable wireless transmitter 90.

The lamp housing 20 is constituted by an upper housing 21 and a lower housing 22 provided with an integrally formed ring gear 25.

The base means 30 for mounting the lamp housing 20 has a flange 31 extended from its bottom and plural fasten holes 32 formed on the flange 31 applied for permanently mounting the base 30 by means of screws to the roof of a vehicle or the deck of a boat.

The lamp means 40 with a bulb is pivotedly mounted in the lamp housing 20 for vertical movement, which includes a bulb housing 41 with a bearing means for mounting in the lamp housing 20 and a vertical gear member 43 integrally formed on back of the bulb housing 41. And, the bulb of the lamp means 40 is connected by leads 71 of the electrical cable 70 to a 12-volt DC power source.

The vertical drive means 50 is mounted in the lamp housing 20 as shown in FIG. 2 for vertically driving the lamp means 40, which includes a reversible gear motor 51 having an output shaft with pinion means 52 for engaging the vertical gear member 43 of the lamp means 40. And, the reversible gear motor 51 is connected by leads 72 of the electrical cable 70 to a 12-volt DC power source.

The horizontal drive means 60 is mounted in the base means 30 for driving the lamp means 40 and lamp housing 20 in a horizontal plane less than 360 degrees, which includes a reversible gear motor 61 having an output shaft with a pinion means 62 for engaging the ring gear 25 of the lamp housing 20. And, the reversible gear motor 61 is connected by leads 73 of the electrical cable 70 to a 12-volt DC power source.

The separated portable wireless transmitter 90 includes a four-way directional control switch SW1, SW2, SW3 and SW4, an on/off switch SW5, an encoder 91 and a signal transmitting unit 92, and the power for the wireless transmitter 90 is supplied by a replaceable internal power supply, e.g. a 9-volt battery.

When any one of switches of SW1, SW2, SW3, SW4 and SW5 of the wireless transmitter 90 is pressed, an identification code with corresponding RF (radio frequency) signal information is generated from the encoder 91 and further transmitted out through the signal transmitting unit 92 by surface acoustic waves (SAW). It is meant the wireless transmitter 90 is capable of sending out the RF control signals including a Power On/Off controlled RF signal by pressing the switch SW5, a lamp tilting in vertical direction controlled RF signal by pressing the switch SW3 or SW4, and a lamp rotating in a horizontal direction controlled RF signal by pressing the switch SW1 or SW2.

Therefore, while the vehicle or the boat is parked, the wireless transmitter 90 shall be portable to a distance away from the vehicle or the boat to operate the searchlight 15 of the invention by wireless remotely control.

The hand-held manipulator 80 is assembled on the electrical cable 70 with its assembling position outside and away from the lamp housing 20 and the base means 30, which is particularly designed to have two useful purposes.

For the first useful purpose of the hand-held manipulator 80 is to control the leads 71, 72 or 73 of the electrical cable 70 to be in open circuit or close circuit so that the wireless remote-controlled searchlight 15 shall be operated by manual remotely control, while the electrical cable 70 is supplied a 12-volt DC power source from the vehicle through the plug 75 or from the boat battery.

For the second useful purpose of the hand-held manipulator 80 is used to install a RF receiver 81 to receive the RF control signals transmitted from the separated portable wireless transmitter 90 including the Power On/Off controlled RF signal, the lamp tilting in vertical direction controlled RF signal or the lamp rotating in a horizontal direction controlled RF signal. And, due to the RF receiver 81 installed inside the hand-held manipulator 80, the hand-held manipulator 80 is also capable of controlling the leads 71, 72 or 73 of the electrical cable 70 to be in open circuit or close circuit by wireless remotely control from the separated portable wireless transmitter 90.

To achieve the two useful purposes mentioned above, the hand-held manipulator 80 is designed to have a four-way directional control switch SW1, SW2, SW3 and SW4, an on/off switch SW5, a RF receiver 81, a microcontroller (MCU) 82 with ROM or EEPROM, a hand controlled circuit 83, a relay actuated circuit 84 and a motor actuated circuit 85. In addition, a current voltage regulator is adapted to convert 12-volt DC power source into a 5-volt DC current power which is required by the RF receiver 81, the MCU 82, the ROM or EEPROM, and the hand controlled circuit 83.

The RF receiver 81 is installed inside the hand-held manipulator 80, and which function is to receive the identification code and the RF signal transmitted from the wireless transmitter 90 and subsequently send the received identification code and RF signal to the input port of the MCU 82.

The MCU 82 is an IC component that independently carries out specific control functions and integrates related circuits for the central processing unit (CPU), read-on memory (ROM) or electrically erasable programmable read-on memory (EEPROM), random access memory, I/O control circuit and CTC timer on a single chip.

Since the ROM or EEPROM of the MCU 82 contains the information of the identification code and the corresponding decoding for the received RF control signals transmitted from the wireless transmitter 90, therefore, after the identification code received by the receiver 81 is confirmed, the MCU 82 will base on the input corresponding received RF signals and the decoded corresponding control signals to output a corresponding controlling signal to the relay actuated circuit 84 or the motor actuated circuit 85, or both.

The relay actuated circuit 84 is functioned to have the leads 71 of the electrical cable 70 normally kept in open circuit, and the leads 71 of the electrical cable 70 is to become either in open circuit or in close circuit only if a related power on/off controlling signal had output from the MCU 82 to control the relay actuated circuit 84.

By wireless remotely control, while the receiver 81 is received the Power On/Off controlled RF signal transmitted from the wireless transmitter 90, it is meant the bulb of the lamp means 40 shall be illuminated for searchlight according to the fact that the relay actuated circuit 84 is controlled by the MCU 82 to be in close circuit. Otherwise, the bulb of the lamp means 40 is not illuminated when the relay actuated circuit 84 is further controlled by the MCU 82 to be in open circuit.

Similarly, the motor actuated circuit 85 is functioned to have the leads 72 and 73 of the electrical cable 70 normally kept in open circuit, and the lead 72 or the lead 73 of the electrical cable 70 is to become either in open circuit or in close circuit only if a related tilting controlled signal or rotating controlled signal had output from the MCU 82 to actuate the motor actuated circuit 85.

By wireless remotely control, while the receiver 81 is received the lamp tilting in vertical direction or rotating in a horizontal direction controlled RF signal transmitted from the wireless transmitter 90, it is meant either the reversible gear motor 51 of vertical drive means 50 shall be actuated for vertically driving the lamp means 40 or the reversible gear motor 61 of horizontal drive means 60 shall be actuated for horizontal driving the lamp means 40, according to the fact that the motor actuated circuit 85 is to have the lead 72 or the lead 73 of the electrical cable 70 become in close circuit until to be in open circuit.

By manual remotely control, the hand controlled circuit 83 is adapted to actuate the relay actuated circuit 84 and/or the motor actuated circuit 85. While one of the four-way directional control switch SW1, SW2, SW3 and SW4 of the hand-held manipulator 80 is selectively pressed, the motor actuated circuit 85 is to have the lead 72 or the lead 73 of the electrical cable 70 become in close circuit to execute either tilting or rotating the lamp means 40 by hand.

And, while the on/off switch SW5 of the hand-held manipulator 80 is pressed, an executed signal to have the bulb of the lamp means 40 in illumination is send to the input port of the MCU 82, and then a related power on/off controlling signal shall output from the MCU 82 to control the relay actuated circuit 84 to have the leads 71 of the electrical cable 70 to become in close circuit. While the on/off switch SW5 of the hand-held manipulator 80 is pressed again, the MCU 82 shall further control the relay actuated circuit 84 to have the leads 71 of the electrical cable 70 to become in open circuit.

In the meantime, the microcontroller MCU 82 may add a learning circuit with a learning function, so that if the wireless transmitter 90 is missing or lost, then the identification code can be inputted for a new wireless transmitter 90 to replace the original one.

Another preferred embodiment of wireless remote-controlled searchlight 15 of this present invention is further provided with a waterproof cover 29 which is securely assembled on the lamp housing 20 and positioned in front of the lamp means 40 to cover the gap existed due to the lamp means 40 installed inside the lamp housing 20 with vertical rotational movement.

With the waterproof cover 29, the wireless remote-controlled searchlight 15 of this present invention has function of preventing rain water from seeping into the interior of the searchlight 15, so that the searchlight 15 of the invention shall be always kept in normal use under stress of weather.

Due to the hand-held manipulator 80 assembled on the electrical cable 70 with a assembling position outside and away from the lamp housing 20 and the base means 30, the RF receiver 81 installed inside the hand-held manipulator 80 shall be prevented from radio interference caused from the vertical drive means 50 and horizontal drive means 60, so that this present invention has the advantage of being easy to wireless remotely control with great precision.

What is claimed is:

1. A wireless remote-controlled searchlight comprising:

an electric cable with a plug and three leads to supply power source to the searchlight;

a lamp housing constituted by an upper housing and a lower housing with an integrally formed ring gear;

a base means for mounting the lamp housing;

a lamp means for pivotedly mounting in the lamp housing for vertical movement, which includes a bulb housing with a bulb connected by leads of the electric cable and a vertical gear member integrally formed on the back of the bulb housing;

a vertical drive means mounted in the lamp housing for vertically driving the lamp means, which includes a reversible gear motor connected by leads of the electric cable having an output shaft with a pinion means for engaging the vertical gear member of the lamp means;

a horizontal drive means mounted in the base means for driving the lamp means and lamp housing in a horizontal plane, which includes a reversible gear motor connected by leads of the electric cable having an output shaft with a pinion means for engaging the ring gear of the lamp housing;

a separated portable wireless transmitter adapted to transmit a Power On/Off controlled RF signal, a lamp tilting in vertical direction controlled RF signal or a lamp rotating in a horizontal direction controlled RF signal, the wireless transmitter comprising an on/off switch, a four-way directional control switch, an encoder and a signal transmitting unit; and a hand-held manipulator connected to the electrical cable and positioned outside and away from the lamp housing and the base means, the hand-held manipulator comprising a hand controlled circuit adapted to manually and remotely control tilting or rotating the lamp means or power on/off to the bulb of the lamp means;

a four-way directional control switch SW1, SW2, SW3 and SW4 configured to, when pressed by hand through the hand controlled circuit, execute either tilting or rotating the lamp means;

an on/off switch SW5 configured to, when pressed by hand through the hand controlled circuit, have the bulb of the lamp means to be illuminated for searchlight or not;

a RF receiver installed inside the handheld manipulator to receive the controlled RF signals transmitted from the separate portable wireless transmitter;

a MCU to output a power on/off controlling signal, a tilting controlled signal or a rotating controlled signal according to the input corresponding received RF signals from the RF receiver or an executed signal sent from the hand controlled circuit while the on/off switch SW5 being processed;

a relay actuated circuit configured such that the leads of the electrical cable connected to the bulb of the lamp means are normally kept in an open circuit state and are put in a closed circuit state only if the power on/off controlling signal is output from the MCU to control the relay actuated circuit; and a motor actuated circuit configured such that the leads of the electrical cable respectively connected to the reversible gear motor of the vertical drive means or the horizontal drive means are normally kept in an open circuit state and are put in a closed circuit state only if either the tilting controlled signal or the rotating controlled signal is output from the MCU or while one of the switches SW1, SW2, SW3 and SW4 is pressed to have the hand controlled circuit to actuate the motor actuated circuit.

2. The wireless remote-controlled searchlight as defined in claim 1, wherein a waterproof cover is securely assembled on the lamp housing and positioned in front of the lamp means to prevent water from seeping into the interior of the searchlight.

3. The wireless remote-controlled searchlight as defined in claim 1, wherein the MCU has a learning circuit with a learning function.

* * * * *